(12) United States Patent
Zhang et al.

(10) Patent No.: US 11,563,243 B2
(45) Date of Patent: Jan. 24, 2023

(54) CHARGING CONTROL METHOD, DEVICE AND STORAGE MEDIUM

(71) Applicant: BEIJING XIAOMI MOBILE SOFTWARE CO., LTD., Beijing (CN)

(72) Inventors: Jinhu Zhang, Beijing (CN); Lingli Han, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 217 days.

(21) Appl. No.: 16/871,376

(22) Filed: May 11, 2020

(65) Prior Publication Data

US 2021/0126474 A1    Apr. 29, 2021

(30) Foreign Application Priority Data

Oct. 23, 2019    (CN) .......................... 201911014283.4

(51) Int. Cl.
*H01M 10/44* (2006.01)
*H02J 7/00* (2006.01)
*H01M 10/48* (2006.01)

(52) U.S. Cl.
CPC ....... *H01M 10/443* (2013.01); *H01M 10/486* (2013.01); *H02J 7/00041* (2020.01)

(58) Field of Classification Search
CPC .. H02J 7/00041; H02J 7/0003; H02J 7/00032; H02J 7/00034; H02J 7/00036;

(Continued)

(56) References Cited

U.S. PATENT DOCUMENTS 7,180,269 B2* 2/2007 Izumi ................... H02J 7/0071
                                                        320/150
7,429,849 B2* 9/2008 Shoji ................... G01R 31/396
                                                        324/426

(Continued)

FOREIGN PATENT DOCUMENTS

CN    105552988 A    5/2016
CN    106340933 A    1/2017

(Continued)

OTHER PUBLICATIONS

Extended European Search Report in Application No. 20182186.5, dated Dec. 1, 2020.

*Primary Examiner* — Jerry D Robbins
(74) *Attorney, Agent, or Firm* — Syncoda LLC; Feng Ma

(57) ABSTRACT

A charging control method includes: monitoring a real-time temperature of the battery during charging a battery with a first real-time charging current; reducing the first real-time charging current to a second real-time charging current at a specified current reduction rate, when the real-time temperature of the battery is greater than a first temperature threshold, the second real-time charging current being a real-time charging current corresponding to that the real-time temperature of the battery is less than the first temperature threshold; and charging the battery according to the second real-time charging current. As such, the temperature rise problem during high-current high-power fast charging can be alleviated, and excessive fluctuations due to instantaneous current adjustment can be prevented from affecting the charging rate thereby improving user experience.

18 Claims, 4 Drawing Sheets

(58) Field of Classification Search
CPC .............. H02J 7/00038; H02J 7/00045; H02J 7/00047; H01M 10/443; H01M 10/486
USPC ........................................................ 320/106
See application file for complete search history.

(56) References Cited

U.S. PATENT DOCUMENTS

| | | | |
|---|---|---|---|
| 7,592,776 B2* | 9/2009 | Tsukamoto | H02J 7/00309 320/136 |
| 9,827,872 B1* | 11/2017 | Sloan | B60L 58/26 |
| 2008/0212249 A1* | 9/2008 | Grewe | H02J 7/007192 361/103 |
| 2015/0158392 A1* | 6/2015 | Zhao | B64C 39/024 320/109 |
| 2016/0190661 A1* | 6/2016 | Kuruma | H01M 10/657 701/36 |
| 2017/0366035 A1* | 12/2017 | Meng | H01M 10/44 |
| 2018/0183261 A1* | 6/2018 | Kwak | H01M 10/60 |
| 2018/0191183 A1* | 7/2018 | Namiki | H05K 7/20145 |
| 2018/0262017 A1* | 9/2018 | Hsu | H01M 10/443 |
| 2019/0140457 A1* | 5/2019 | Dong | H02J 7/00309 |

FOREIGN PATENT DOCUMENTS

| | | | |
|---|---|---|---|
| EP | 3300161 | A1 | 3/2018 |
| WO | 9305559 | A1 | 3/1993 |

* cited by examiner

CHARGING CONTROL METHOD, DEVICE AND STORAGE MEDIUM

CROSS-REFERENCE TO RELATED APPLICATION

This application claims priority to Chinese Patent Application No. 201911014283.4 filed on Oct. 23, 2019, the disclosure of which is hereby incorporated by reference in its entirety.

BACKGROUND

With the advent of 5G era, the era of "Internet of Everything" is about to begin. Mobile terminals such as smart phones etc. are used more and more frequently as windows of "Internet of Everything," various high-power usage scenarios require mobile terminals to have sufficient power, large capacity is essential. Therefore, high-current high-power fast charging will definitely become a future trend.

SUMMARY

The present disclosure relates to the field of charging technology, and more specifically, to a charging control method, a charging control device, and a storage medium.

According to a first aspect of embodiments of the present disclosure, there is provided a charging control method, including:

monitoring a real-time temperature of the battery during the process of charging a battery with a first real-time charging current; reducing the first real-time charging current to a second real-time charging current at a specified current reduction rate, when the real-time temperature of the battery is greater than a first temperature threshold, the second real-time charging current being a corresponding real-time charging current when the real-time temperature of the battery is less than the first temperature threshold; and charging the battery according to the second real-time charging current.

In some embodiments, reducing the first real-time charging current to a second real-time charging current at a specified current reduction rate, when the real-time temperature of the battery is greater than a first temperature threshold includes:

reducing the first real-time charging current to a second real-time charging current through at least one cycle, when it is determined that the real-time temperature of the battery is greater than the first temperature threshold, wherein each cycle is matched with a corresponding current reduction rate.

In some embodiments, reducing the first real-time charging current to a second real-time charging current through at least one cycle includes:

reducing the charging current at a current reduction rate corresponding to a current cycle, and re-monitoring the real-time temperature of the battery, when a time length corresponding to the current cycle is reached; if the real-time temperature of the battery is greater than the first temperature threshold, entering a next cycle; if the real-time temperature of the battery is less than or equal to the first temperature threshold, using the current charging current as the second real-time charging current.

In some embodiments, a current reduction rate corresponding to an N-th cycle is greater than a current reduction rate corresponding to an (N−1)-th cycle, and N is a positive integer greater than or equal to 2.

In some embodiments, before reducing the first real-time charging current to a second real-time charging current at a specified current reduction rate, the charging control method involved in the embodiments of the present disclosure further includes:

continuously monitoring the real-time temperature of the battery, when it is determined that the real-time temperature of the battery is greater than the first temperature threshold, and determining that a time length when the real-time temperature of the battery exceeds the first temperature threshold reaches a first time length.

In some embodiments, the charging control method involved in the embodiments of the present disclosure further includes:

restoring charging with the first real-time charging current, after charging the battery with the second real-time charging current for a time period greater than a specified time threshold; or restoring charging with the first real-time charging current, when it is monitored that the real-time temperature of the battery is less than or equal to the second temperature threshold.

In some embodiments, the charging control method involved in the embodiments of the present disclosure further includes:

reducing the first real-time charging current to a maximum charging current that corresponds to a charging current level corresponding to a current number threshold when a number of times of reducing the charging current reaches a specified number threshold; wherein a different number threshold corresponds to a different charging current level, and a different charging current level corresponds to a different maximum charging current.

In yet another embodiment, the first real-time charging current is a maximum charging current supported by the battery.

In some embodiments, the second temperature threshold is less than the first temperature threshold, and the first temperature threshold is close to but less than a maximum temperature in a corresponding charging temperature range when the battery is charged with the first real-time charging current.

According to a second aspect of embodiments of the present disclosure, there is provided a charging control device, including:

a temperature monitoring module configured to monitor a real-time temperature of the battery, during the process of charging a battery with a first real-time charging current; a current control module configured to reduce the first real-time charging current to a second real-time charging current at a specified current reduction rate, when the temperature monitoring module monitors that the real-time temperature of the battery is greater than a first temperature threshold, and charge the battery according to the second real-time charging current, wherein the second real-time charging current is a corresponding real-time charging current when the real-time temperature of the battery is less than the first temperature threshold.

In some embodiments, the current control module is configured to reduce the first real-time charging current to a second real-time charging current at a specified current reduction rate when the temperature monitoring module monitors that the real-time temperature of the battery is greater than a first temperature threshold by adopting the following manner:

reducing the first real-time charging current to a second real-time charging current through at least one cycle, when the temperature monitoring module determines that the real-time temperature of the battery is greater than the first temperature threshold, wherein each cycle is matched with a corresponding current reduction rate.

In some embodiments, the current control module is configured to adopt the following manner to implement reducing the first real-time charging current to a second real-time charging current through at least one cycle:

reducing the charging current at a current reduction rate corresponding to a current cycle, and re-monitoring the real-time temperature of the battery, when a time length corresponding to the current cycle is reached; if the real-time temperature of the battery is greater than the first temperature threshold, entering a next cycle; if the real-time temperature of the battery is less than or equal to the first temperature threshold, using the current charging current as the second real-time charging current.

In some embodiments, a current reduction rate corresponding to an N-th cycle is greater than a current reduction rate corresponding to an (N−1)-th cycle, N is a positive integer greater than or equal to 2.

In some embodiments, the temperature monitoring module is further configured to: continuously monitor the real-time temperature of the battery, when it is determined that the real-time temperature of the battery is greater than the first temperature threshold, and the current control module is further configured to: determine that a time length when the real-time temperature of the battery exceeds the first temperature threshold reaches a first time length before reducing the first real-time charging current to a second real-time charging current at a specified current reduction rate.

In some embodiments, the current control module is further configured to:

restore charging with the first real-time charging current after charging the battery with the second real-time charging current for a time period greater than a specified time threshold; or restore charging with the first real-time charging current when the temperature monitoring module monitors that the real-time temperature of the battery is less than or equal to the second temperature threshold.

In some embodiments, the charging control module is further configured to:

reduce the first real-time charging current to a maximum charging current that corresponds to a charging current level corresponding to a current number threshold when the number of times of reducing the charging current reaches a specified number threshold; wherein a different number threshold corresponds to a different charging current level, and a different charging current level corresponds to a different maximum charging current.

In some embodiments, the first real-time charging current is a maximum charging current supported by the battery.

In some embodiments, the second temperature threshold is less than the first temperature threshold, and the first temperature threshold is close to but less than a maximum temperature in a corresponding charging temperature range when the battery is charged with the first real-time charging current.

According to a third aspect of embodiments of the present disclosure, there is provided a charging control device, including:

a processor; and a memory for storing instructions executable by the processor; wherein the processor is configured to: execute the charging control method according to the first aspect or any of the implementation of the first aspect.

According to a fourth aspect of embodiments of the present disclosure, there is provided a non-transitory computer-readable storage medium having stored therein instructions that, when executed by a processor of a mobile terminal, causes the mobile terminal to perform the charging control method according to the first aspect or any of the implementation of the first aspect.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this description, illustrate embodiments consistent with the present disclosure and, together with the description, serve to explain the principles of the present disclosure.

DETAILED DESCRIPTION

Figure 1:
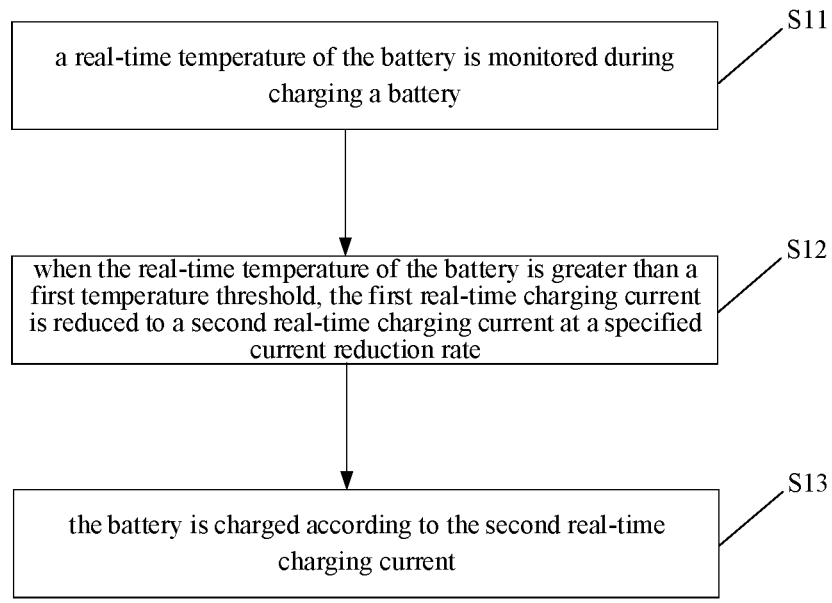
FIG. 1 is a flowchart showing a charging control method according to an exemplary embodiment.

Description will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

High-current high-power charging may cause the battery temperature to rise too fast, which would result in the risk of high temperature rise of the entire device to be charged. Various embodiments of the present disclosure can alleviate the problem of temperature rise during high-current high-power fast charging, thereby improving user experience.

A charging control method provided by some embodiments of the present disclosure can be applied to an application scenario of charging a battery of a mobile terminal such as a smart phone, etc. In an application scenario of charging a battery, charging can be performed in stages according to a charging current and a charging temperature of the battery. For example, charging at a temperature of 0° C. to 15° C. and 45° C. to 60° C. is a small current charging, and charging at a temperature of 15° C. to 45° C. is a large current charging. A typical application scenario of the embodiments of the present disclosure is a high-current charging scenario. In the high-current charging scenario, fast battery charging can be achieved, but the temperature of the battery would also rise quickly.

To make improvement to the effect of rapid temperature rise in the high-current fast-charging scenario, typically the following scheme may be adopted: monitoring a temperature of the battery, and when the temperature of the battery reaches a certain temperature point, immediately reducing the charging current of the battery from a maximum charging current to a very small charging current (close to the charging current that corresponds to stopping the charging). When the temperature of the battery is reduced to meet requirement, the charging current of the battery is increased to the maximum charging current. However, the current decreases and recovers instantaneously, which affects the charging rate, and the temperature rise also fluctuates greatly. And effective monitoring of the battery is affected by repeatedly reducing and restoring the battery charging current and thus user experience is affected.

In view of this, various embodiments of the present disclosure provide a charging control method. When the temperature of the battery is greater than a set temperature threshold, the real-time charging current of the battery is reduced level-by-level at a specified current reduction rate to avoid excessive fluctuations and slow charging caused by instantaneous adjustment of the current.

Further, the charging control method provided in the embodiments of the present disclosure avoids repeated adjustment from affecting the charging rate and the detection accuracy, and improves the user experience.

FIG. 1 is a flowchart showing a charging control method according to an exemplary embodiment, as shown in FIG. 1, the charging control method is applied to a terminal, and includes the steps provided below.

In step S11, a real-time temperature of the battery is monitored during charging a battery.

In some embodiments of the present disclosure, monitoring the battery temperature can be performed by a functional device having a temperature detection function. The present disclosure makes no limitation to the functional device that implements battery temperature monitoring.

In some embodiments of the present disclosure, when the battery is charged in an initial stage, a maximum charging current in a corresponding temperature range can be adopted for charging, of course, the embodiments of the present disclosure make no limitation. For convenience of description in the present disclosure, the charging current corresponding to the temperature detection on the battery in the initial stage is referred to as a first real-time charging current. The first real-time charging current is the maximum charging current.

In step S12, when the real-time temperature of the battery is greater than a first temperature threshold, the first real-time charging current is reduced to a second real-time charging current at a specified current reduction rate.

In order to achieve temperature control in the charging process, a temperature threshold for temperature adjustment can be set according to some embodiments of the present disclosure, and the temperature threshold can be understood as a temperature control point, that is, a specific temperature value.

The setting of the temperature threshold according to some embodiments of the present disclosure can be determined according to a charging current for charging the battery and a supported charging temperature range. For example, when the battery is charged with the maximum charging current, the supported charging temperature range is 15° C. to 45° C.

In order to ensure a high charging rate and achieve accurate temperature rise control according to some embodiments of the present disclosure, the temperature threshold can be determined according to the maximum temperature in a charging range corresponding to performing charging with the current charging current of the battery. For convenience of description, this temperature threshold is referred to as a first temperature threshold.

Herein, the current reduction rate represents the current value decreased per unit time. The current reduction rate is usually determined according to the actual charging control accuracy. In the embodiments of the present disclosure, for example, the unit of the current reduction rate is mA/s. In the process of reducing the first real-time charging current at the specified current reduction rate, it can be understood that the charging current is reduced in intervals, and each time period corresponds to the same or different current reduction rate.

In some embodiments of the present disclosure, in order to achieve temperature-rise control, the temperature of the battery is reduced in real-time to be less than the first temperature threshold, and charging is performed with a corresponding real-time charging current when the real-time temperature of the battery is less than the first real-time charging current. In some embodiments of the present disclosure, for convenience of description, the corresponding real-time charging current when the real-time temperature of the battery is less than the first temperature threshold is referred to as the second real-time charging current.

In step S13, the battery is charged according to the second real-time charging current.

In the embodiments of the present disclosure, the real-time temperature of the battery is monitored during the battery charging process, the first real-time charging current of the battery is reduced at a specified current reduction rate to the second real-time charging current when the real-time temperature of the battery is greater than a first temperature threshold, the temperature rise problem during high-current high-power fast charging can be alleviated, excessive fluctuations due to instantaneous current adjustment can be prevented from affecting the charging rate, and user experience can be improved In the embodiments of the present disclosure, the above-mentioned process of reducing the first real-time charging current to the second real-time charging current at a specified current reduction rate will be described below.

In the embodiments of the present disclosure, it is possible that the first real-time charging current is reduced to the second real-time charging current by adopting a cyclical rate reduction mode, when it is determined that the real-time temperature of the battery is greater than the first temperature threshold. When the cyclical rate reduction mode is adopted according to some embodiments to reduce the rate, one or more cycles can be set, a corresponding current reduction rate can be configured for each cycle, and the first real-time charging current is reduced to the second real-time charging current through at least one cycle.

In some embodiments, the current reduction rate corresponding to each cycle may be different, for example, a current reduction rate corresponding to an N-th cycle is greater than a current reduction rate corresponding to an (N−1)-th cycle, and N is a positive integer greater than or equal to 2. By cyclically reducing the charging current and adopting a mode of increasing the current reduction rate level-by-level, the temperature control efficiency can be improved.

Figure 2:
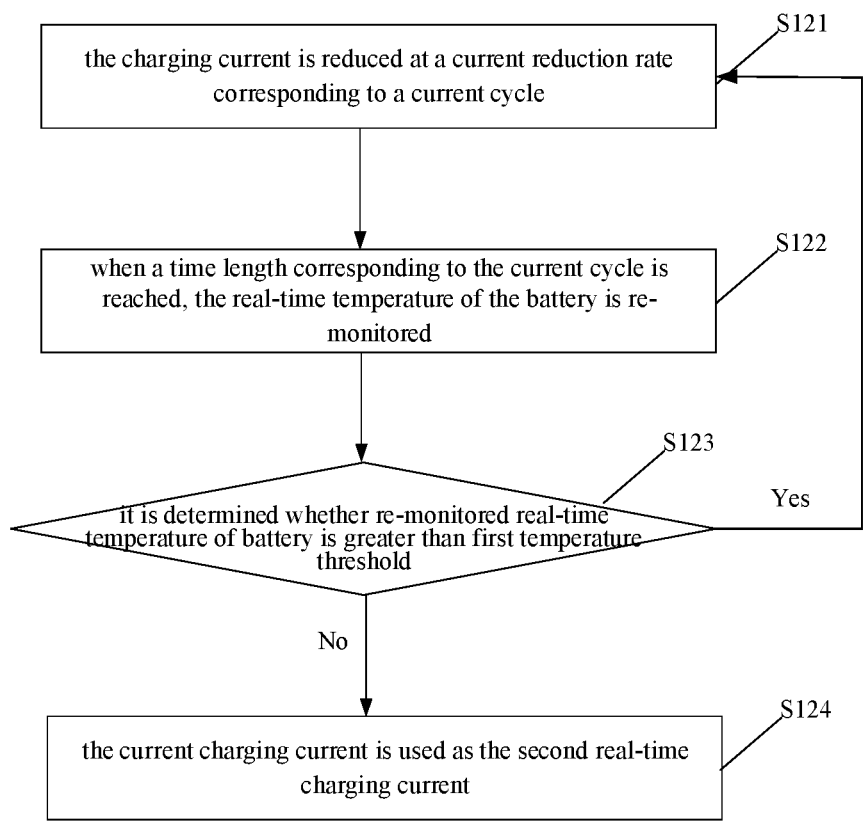
FIG. 2 is a flowchart showing a reduction of the charging current according to an exemplary embodiment.

FIG. 2 is a flowchart showing a reduction of the charging current according to an exemplary embodiment. Referring to the illustration in FIG. 2, the following steps are included.

In step S121, the charging current is reduced at a current reduction rate corresponding to a current cycle.

In step S122, when a time length corresponding to the current cycle is reached, the real-time temperature of the battery is re-monitored.

In step S123, it is determined whether the re-monitored real-time temperature of the battery is greater than the first temperature threshold. When the real-time temperature of the battery is greater than the first temperature threshold, a next cycle is entered to return to execute step S121. When the real-time temperature of the battery is less than or equal to the first temperature threshold, step S124 is executed.

In step S124, the current charging current is used as the second real-time charging current.

In the embodiments of the present disclosure, the above-mentioned process of reducing the first real-time charging current to a second real-time charging current through at least one cycle can be understood as the following procedure.

When it is determined that the real-time temperature of the battery exceeds the first temperature threshold, the first real-time charging current is reduced at a first current reduction rate corresponding to the first cycle within the first cycle. After the duration of reducing the first real-time charging current at the first current reduction rate reaches the time length of the first cycle, the real-time temperature of the battery is re-monitored.

When the re-monitored real-time temperature is less than the first temperature threshold, a corresponding real-time charging current when the real-time temperature of the battery is less than the first temperature threshold is used as the second real-time charging current for charging.

When the re-monitored real-time temperature is greater than the first temperature threshold, the real-time charging current of the battery is reduced, within a second cycle, at a second current reduction rate corresponding to the second cycle. After the duration of reducing the real-time charging current at the second current reduction rate reaches the time length of the second cycle, the real-time temperature of the battery is re-monitored.

When the re-monitored real-time temperature is greater than the first temperature threshold, the real-time charging current of the battery is reduced, within a third cycle, at a third current reduction rate corresponding to the third cycle.

Similarly, the real-time temperature monitoring is repeated and the real-time charging current is reduced N times until the real-time temperature of the battery is detected to be less than the first temperature threshold, the corresponding real-time charging current when the real-time temperature of the battery is less than the first temperature threshold as the second real-time charging current.

Herein, the time lengths of the respective cycles mentioned above can be the same or different. The current reduction rate corresponding to the respective cycles can be the same or different. For example, N is a positive integer greater than or equal to 2, the current reduction rate at which the real-time charging current is reduced for an N-th time is different from the current reduction rate at which the real-time charging current is reduced for an (N−1)-th time. In some embodiments, the current reduction rate corresponding to the N-th cycle is greater than the current reduction rate corresponding to the (N−1)-th cycle.

In some embodiments, in order to improve the accuracy of temperature monitoring, when the real-time temperature of the battery monitored for the first time is greater than the first temperature threshold, the real-time temperature of the battery can be continuously monitored, and after the time length during which the real-time temperature of the battery is determined to exceed the first temperature reaches a first time length, the first real-time charging current is reduced to the second real-time charging current at a specified current reduction rate.

Further, in the embodiments of the present disclosure, in order to increase the charging rate, the original charging current of the battery can be restored following a predetermined time length after reducing the real-time charging current or when the real-time temperature of the battery drops to a predetermined threshold.

Figure 3:
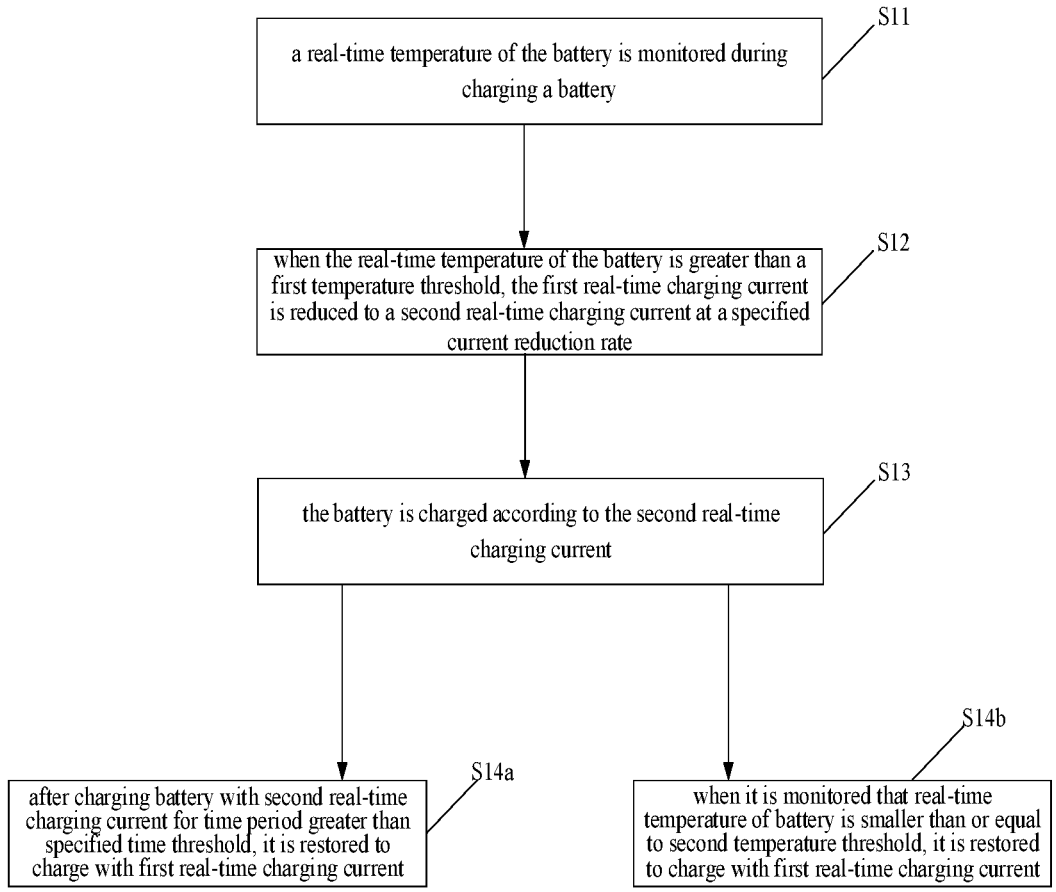
FIG. 3 is a flowchart showing a charging control method according to an exemplary embodiment.

FIG. 3 is a flowchart showing a charging control method according to an exemplary embodiment. The charging control method shown in FIG. 3 further includes the following steps based on the charging control method shown in FIG. 1.

In step S14a, after charging the battery with the second real-time charging current for a time period greater than a specified time threshold, it is restored to charge with the first real-time charging current.

In step S14b, when it is monitored that the real-time temperature of the battery is less than or equal to the second temperature threshold, it is restored to charge with the first real-time charging current.

In the embodiments of the present disclosure, if either one of S14a and S14b is satisfied, it is restored to charge with the first charging current, no limitation is made to the sequence of executing the steps.

In some embodiments of the present disclosure, the above second temperature threshold is a temperature value that is less than the first temperature threshold. Further, the second temperature threshold value should be greater than the lowest temperature within a corresponding charging temperature range when the battery is charged with the first real-time charging current.

Furthermore, in the embodiments of the present disclosure, in order to prevent the battery temperature from being reduced too many times, and to prevent the charging current from being repeatedly adjusted, when N reaches a specified number threshold, the first real-time charging current is reduced to a maximum charging current that corresponds to a charging current level corresponding to a current number threshold.

Herein, a different number threshold corresponds to a different charging current level, and a different charging current level corresponds to a different maximum charging current.

Further, in the process of monitoring the number of times of charging current adjustment in the embodiments of the present disclosure, the monitoring can be performed within a specified temperature range and/or a specified time range.

For example, in the embodiments of the present disclosure, when the number of times for which the real-time temperature of the battery is detected to be greater than the first temperature threshold exceeds n1, within a certain range of temperature, and within a time period ΔP, the maximum charging current of a current m-th level is reduced to be the maximum charging current in an (m−1)-th level. When the number of times for which it is detected that the real-time temperature of the battery exceeds the first temperature threshold is more than n2, the maximum charging current in the (m−1)-th level is decreased continuously to the maximum charging current in an (m−2)-th level, and so on, until the temperature meets the requirements.

In the embodiments of the present disclosure, the above-mentioned charging control method will be described in practical applications.

In the embodiments of the present disclosure, it is assumed that a rechargeable temperature range of the battery is T1-T2, the first temperature threshold is set to TC1, and the second temperature threshold is set to TC2, where T1<TC1<TC2<T2. The monitored battery real-time temperature is Tb. The charging limit voltage of the battery in the T1-T2 temperature range is Vm, the maximum charging current is Im, the real-time voltage of the battery is Vb, the real-time charging current is Ib, and the current reduction rate is S (mA/s).

During the process of charging the battery with the maximum charging current Im, the real-time temperature Tb of the battery is monitored. When Tb≥TC2 and the time exceeds Δt1 (Δt1>0), the current is reduced at a certain current reduction rate S1. After the maximum charging current Im is reduced at S1, the real-time temperature Tb of the battery is monitored when every time Δt elapses. If Tb≥TC2, the real-time charging current Ib is decreased at the current reduction rate S2 (S2>S1), and so on, until Tb<TC2. When Tb<TC2, the current stops decreasing and the current Ib at this moment is maintained. When the time Δt2 elapses or when Tb≤TC1, the battery restores to be charged with the maximum charging current Im (or the maximum charging voltage Vm).

Further, when the number of times that Tb≥TC2 is detected exceeds n1 within a certain range of temperature and within a period of time ΔP, the maximum charging current is reduced to Im−1. When n2 is exceeded, the maximum charging current continues to drop to Im−2, and so on, until Tb<TC2.

In the charging control method provided by the embodiments of the present disclosure, when the temperature of the battery is greater than a predetermined temperature threshold, the real-time charging current of the battery is reduced level-by-level at a specified current reduction rate, so as to avoid excessive fluctuations and slow charging rate caused by instantaneous adjustment of the current. Further, the charging control method provided in the embodiments of the present disclosure avoids repeated adjustment from affecting the charging rate and detection accuracy, and improves the user experience.

Based on similar concepts, the embodiments of the present disclosure further provide a charging control device.

It can be understood that, in order to achieve the above functions, the charging control device provided by the embodiments of the present disclosure includes hardware structures and/or software modules for performing respective functions. With reference to the units and algorithm steps of each example disclosed in the embodiments of the present disclosure, the embodiments of the present disclosure can be implemented in the form of hardware or a combination of hardware and computer software. Whether a certain function is performed by hardware or computer software-driven hardware depends on the specific application and design constraints of the technical solutions. Those skilled in the art can use different methods to implement the described functions for each specific application, but such implementation should not be considered to go beyond the scope of the technical solutions of the embodiments of the present disclosure.

Figure 4:
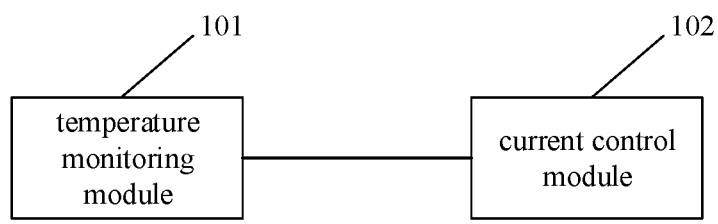
FIG. 4 is block diagram showing a charging control device according to an exemplary embodiment.

FIG. 4 is block diagram showing a charging control device according to an exemplary embodiment. Referring to FIG. 4, the charging control device 100 includes a temperature monitoring module 101 and a current control module 102.

The temperature monitoring module 101 is configured to, during the process of charging a battery with a first real-time charging current, monitor a real-time temperature of the battery. The current control module 102 is configured to, when the temperature monitoring module 101 monitors that the real-time temperature of the battery is greater than a first temperature threshold, reduce the first real-time charging current to a second real-time charging current at a specified current reduction rate, and charge the battery according to the second real-time charging current. Herein, the second real-time charging current is a corresponding real-time charging current when the real-time temperature of the battery is less than the first temperature threshold.

In some embodiments, the current control module 102 is configured to reduce the first real-time charging current to a second real-time charging current at a specified current reduction rate by adopting the following manner when the temperature monitoring module 101 monitors that the real-time temperature of the battery is greater than a first temperature threshold:

when the temperature monitoring module 101 determines that the real-time temperature of the battery is greater than the first temperature threshold, the first real-time charging current is reduced to a second real-time charging current through at least one cycle, wherein each cycle is matched with a corresponding current reduction rate.

The current control module 102 is configured to reduce the first real-time charging current to a second real-time charging current through at least one cycle by adopting the following manner:

the charging current is reduced at a current reduction rate corresponding to a current cycle, when a time length corresponding to the current cycle is reached, the real-time temperature of the battery is re-monitored. If the real-time temperature of the battery is greater than the first temperature threshold, a next cycle is entered. If the real-time temperature of the battery is less than or equal to the first temperature threshold, the current charging current is used as the second real-time charging current.

In some embodiments, a current reduction rate corresponding to an N-th cycle is greater than a current reduction rate corresponding to an (N−1)-th cycle, and N is a positive integer greater than or equal to 2.

In some embodiments, the temperature monitoring module 101 is further configured to: when it is determined that the real-time temperature of the battery is greater than the first temperature threshold, continuously monitor the real-time temperature of the battery. The current control module 102 is further configured to: before reducing the first real-time charging current to a second real-time charging current at a specified current reduction rate, determine that a time length when the real-time temperature of the battery exceeds the first temperature threshold reaches a first time length.

In some embodiments, the current control module 102 is further configured to:

after charging the battery with the second real-time charging current for a time period greater than a specified time threshold, restore charging with the first real-time charging current; or when the temperature monitoring module 101 monitors that the real-time temperature of the battery is less than or equal to the second temperature threshold, restore charging with the first real-time charging current.

In some embodiments, the charging control module is further configured to:

when the number of times of reducing the charging current reaches a specified number threshold, reduce the first real-time charging current to a maximum charging current that corresponds to a charging current level corresponding to a current number threshold; wherein a different number threshold corresponds to a different charging current level, and a different charging current level corresponds to a different maximum charging current.

In some embodiments, the first real-time charging current is a maximum charging current supported by the battery.

In some embodiments, the second temperature threshold is less than the first temperature threshold, and the first temperature threshold is close to but less than a maximum temperature in a corresponding charging temperature range when the battery is charged with the first real-time charging current.

With respect to the devices in the above embodiments, the specific manners for performing operations for individual modules therein have been described in detail in the embodiments regarding the methods, which will not be elaborated herein.

Figure 5:
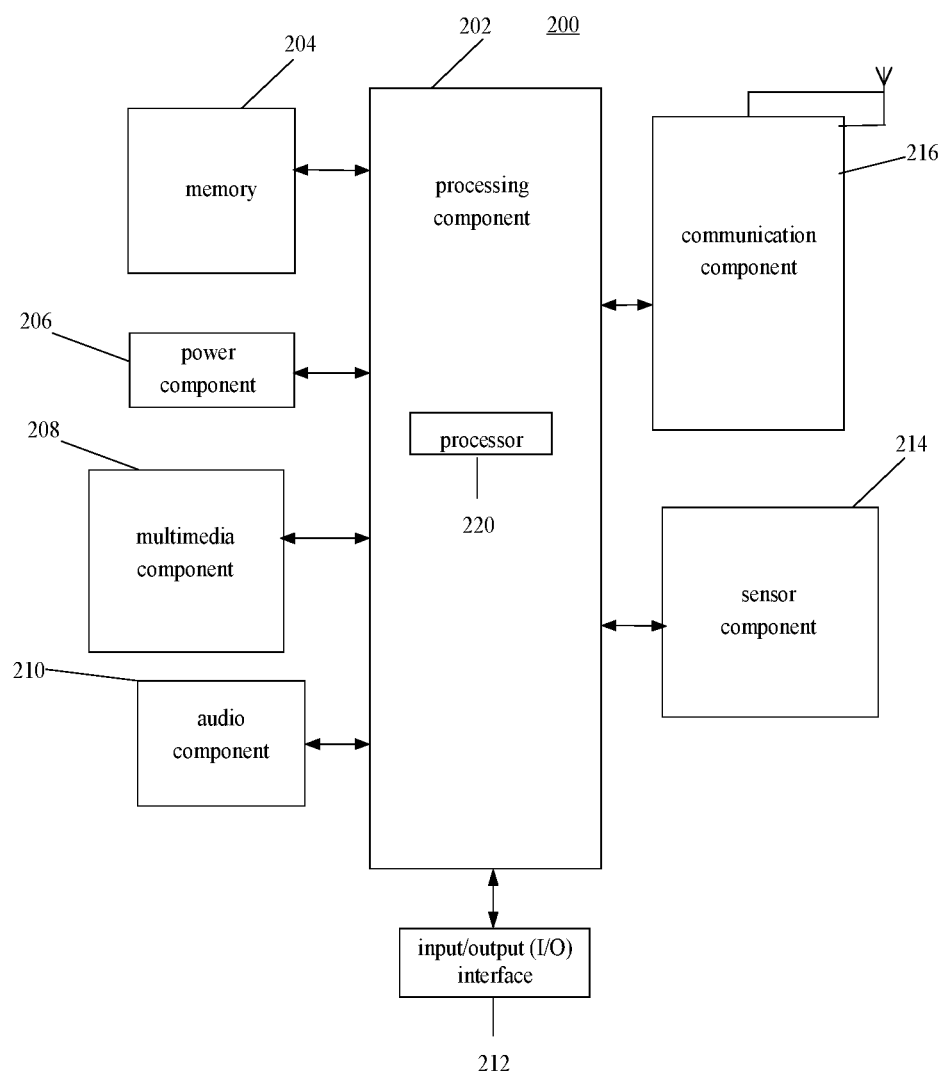
FIG. 5 is a block diagram showing a charging control device according to an exemplary embodiment.
Figure 6:
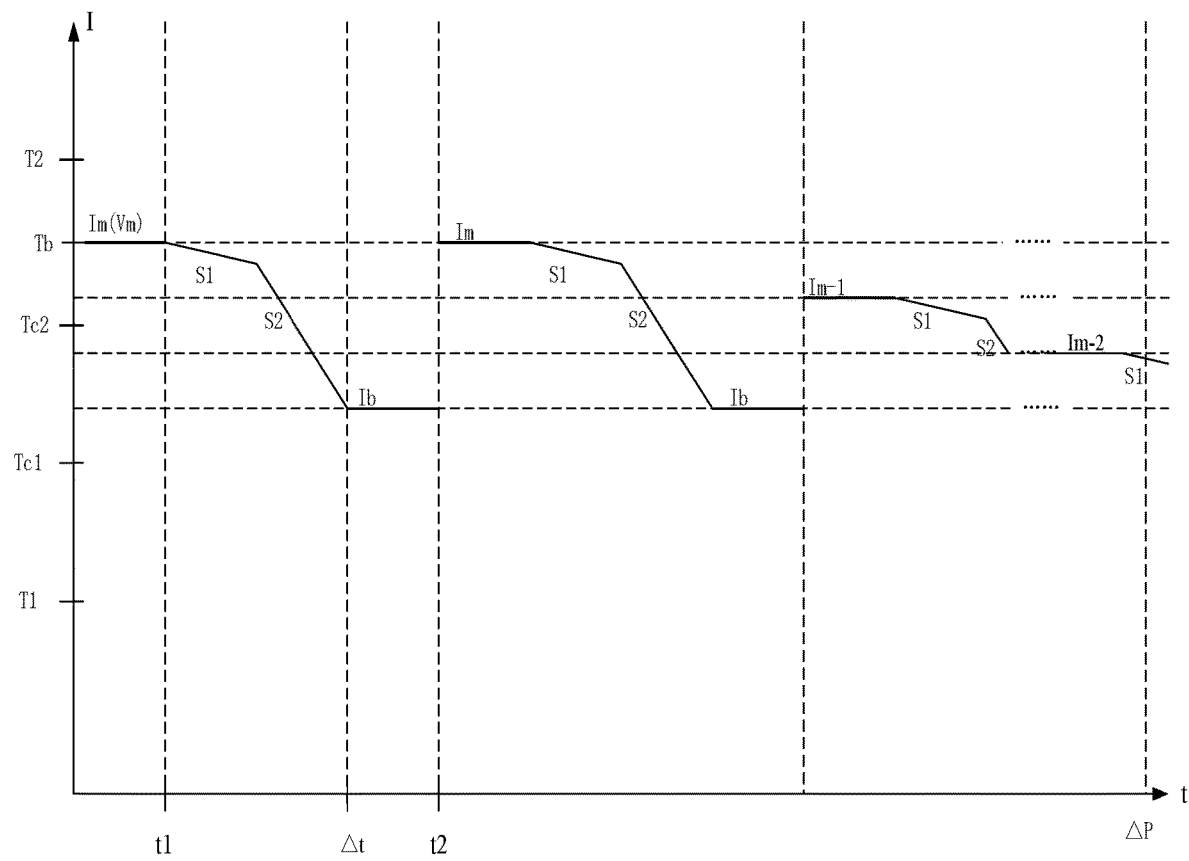
FIG. 6 is a schematic diagram illustrating a waveform of the charging currents varying with the temperature.

FIG. 5 is a block diagram showing a charging control device 200 according to an exemplary embodiment. For example, the charging control device 200 can be a mobile phone, a computer, a digital broadcast terminal, a messaging device, a gaming console, a tablet, a medical device, exercise equipment, a personal digital assistant, and the like.

Referring to FIG. 5, the charging control device 200 can include one or more of the following components: a processing component 202, a memory 204, a power component 206, a multimedia component 208, an audio component 210, an input/output (I/O) interface 212, a sensor component 214, and a communication component 216.

The processing component or processing circuit 202 typically controls overall operations of the charging control device 200, such as the operations associated with display, telephone calls, data communications, camera operations, and recording operations. The processing component 202 can include one or more processors 220 to execute instructions to perform all or part of the steps in the above described methods. Moreover, the processing component 202 can include one or more modules which facilitate the interaction between the processing component 202 and other components. For instance, the processing component 202 can include a multimedia module to facilitate the interaction between the multimedia component 208 and the processing component 202.

The memory 204 is configured to store various types of data to support the operation of the device 200. Examples of such data include instructions for any applications or methods operated on the charging control device 200, contact data, phonebook data, messages, pictures, video, etc. The memory 204 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 206 provides power to various components of the charging control device 200. The power component 206 can include a power management system, one or more power sources, and any other components associated with the generation, management, and distribution of power in the charging control device 200.

The multimedia component 208 includes a screen providing an output interface between the charging control device 200 and the user. In some embodiments, the screen can include a liquid crystal display (LCD) and a touch panel (TP). In some embodiments, an organic light-emitting diode (OLED) display or other types of displays can be employed.

If the screen includes the touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also sense a period of time and a pressure associated with the touch or swipe action. In some embodiments, the multimedia component 208 includes a front camera and/or a rear camera. The front camera and the rear camera can receive an external multimedia datum while the device 200 is in an operation mode, such as a photographing mode or a video mode. Each of the front camera and the rear camera can be a fixed optical lens system or have focus and optical zoom capability.

The audio component 210 is configured to output and/or input audio signals. For example, the audio component 210 includes a microphone (MIC) configured to receive an external audio signal when the charging control device 200 is in an operation mode, such as a call mode, a recording mode, and a voice recognition mode. The received audio signal can be further stored in the memory 204 or transmitted via the communication component 216. In some embodiments, the audio component 210 further includes a speaker to output audio signals.

The I/O interface 212 provides an interface between the processing component 202 and peripheral interface modules, such as a keyboard, a click wheel, buttons, and the like. The buttons can include, but are not limited to, a home button, a volume button, a starting button, and a locking button.

The sensor component 214 includes one or more sensors to provide status assessments of various aspects of the charging control device 200. For instance, the sensor component 214 can detect an open/closed status of the device 200, relative positioning of components, e.g., the display and the keypad, of the charging control device 200, the sensor component 214 can also detect a change in position of the charging control device 200 or a component of the charging control device 200, a presence or absence of user contact with the charging control device 200, an orientation or an acceleration/deceleration of the charging control device 200, and a change in temperature of the charging control device 200. The sensor component 214 can include a proximity sensor configured to detect the presence of nearby objects without any physical contact. The sensor component 214 can also include a light sensor, such as a CMOS or CCD image sensor, for use in imaging applications. In some embodiments, the sensor component 214 can also include an accelerometer sensor, a gyroscope sensor, a magnetic sensor, a pressure sensor, or a temperature sensor.

The communication component 216 is configured to facilitate communication, wired or wirelessly, between the charging control device 200 and other devices. The charging control device 200 can access a wireless network based on a communication standard, such as Wi-Fi, 2G, 3G, 4G, 5G, or a combination thereof. In one exemplary embodiment, the communication component 216 receives a broadcast signal or broadcast associated information from an external broadcast management system via a broadcast channel. In one exemplary embodiment, the communication component 216 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

The various device components, units, blocks, or portions may have modular configurations, or are composed of discrete components, but nonetheless can be referred to as "modules" in general. In other words, the "components," "modules," "blocks," "portions," or "units" referred to herein may or may not be in modular forms.

In exemplary embodiments, the charging control device 200 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as the memory 204 including instructions, executable by the processor 220 in the charging control device 200, for performing the above-described methods. For example, the non-transitory computer-readable storage medium can be a ROM, a RAM, a CD-ROM, a magnetic tape, a floppy disc, an optical data storage device, and the like.

Various embodiments of the present disclosure can include one or more of the following advantages. The real-time temperature of the battery can be monitored during charging the battery, the real-time charging current of the battery can be reduced at a specified current reduction rate when the real-time temperature of the battery is greater than a temperature threshold, the temperature rise problem during high-current high-power fast charging can be alleviated, and user experience can be improved.

It is to be understood that the singular forms "a" "the" and "this" in the present disclosure are intended to include the plural forms as well, unless the context clearly indicates otherwise.

It can be further understood that, although the operations in the embodiments of the present disclosure are described in a specific order in the drawings, they should not be understood as requiring that the operations should be performed in the specific order or serial order shown, or requiring that all the operations shown should be performed to get the desired result. In certain environments, multitasking and parallel processing can be advantageous.

Other embodiments of the present disclosure will be easily conceivable to those skilled in the art from consideration of the description and practice of the invention disclosed here. This application is intended to cover any variations, uses, or adaptations of the present disclosure following the general principles thereof and including such departures from the present disclosure as come within common knowledge or customary technical measures in the art. It is intended that the description and examples be considered as exemplary only, with a true scope and spirit of the present disclosure being indicated by the appended claims.

It will be appreciated that the present disclosure is not limited to the exact construction that has been described above and illustrated in the accompanying drawings, and that various modifications and changes can be made without departing from the scope thereof. Other embodiments of the present disclosure will be easily conceivable to those skilled in the art from consideration of the description and practice of the invention disclosed here. This application is intended to cover any variations, uses, or adaptations of the present disclosure following the general principles thereof and including such departures from the present disclosure as come within common knowledge or customary technical measures in the art. It is intended that the description and examples be considered as exemplary only, with a true scope and spirit of the present disclosure being indicated by the appended claims.

The invention claimed is:

1. A charging control method, comprising:
monitoring a real-time temperature of a battery during charging the battery with a first real-time charging current;
reducing the first real-time charging current to a second real-time charging current at a specified current reduction rate, when the real-time temperature of the battery is greater than a first temperature threshold, by reducing the first real-time charging current to the second real-time charging current through at least one cycle, when it is determined that the real-time temperature of the battery is greater than the first temperature threshold, wherein each cycle is matched with a corresponding current reduction rate, the second real-time charging current being a corresponding real-time charging current when the real-time temperature of the battery is less than the first temperature threshold; and
charging the battery according to the second real-time charging current.

2. The charging control method according to claim 1, wherein the reducing the first real-time charging current to a second real-time charging current through at least one cycle comprises:
reducing the charging current at a current reduction rate corresponding to a current cycle, and re-monitoring the real-time temperature of the battery, when a time length corresponding to the current cycle is reached;
if the real-time temperature of the battery is greater than the first temperature threshold, entering a next cycle;
if the real-time temperature of the battery is less than or equal to the first temperature threshold, using the current charging current as the second real-time charging current.

3. The charging control method according to claim 2, further comprising:
reducing the first real-time charging current to a maximum charging current that corresponds to a charging current level corresponding to a current number threshold, when a number of times of reducing the charging current reaches a specified number threshold,
wherein a different number threshold corresponds to a different charging current level, and a different charging current level corresponds to a different maximum charging current.

4. The charging control method according to claim 1, wherein a current reduction rate corresponding to an N-th cycle is greater than a current reduction rate corresponding to an (N−1)-th cycle, and N is a positive integer greater than or equal to 2.

5. The charging control method according to claim 1, wherein prior to the reducing the first real-time charging current to a second real-time charging current at a specified current reduction rate, the method further comprises:
continuously monitoring the real-time temperature of the battery, when it is determined that the real-time temperature of the battery is greater than the first temperature threshold, and determining that a time length when the real-time temperature of the battery exceeds the first temperature threshold reaches a first time length.

6. The charging control method according to claim 1, further comprising at least one of:

restoring charging with the first real-time charging current, after charging the battery with the second real-time charging current for a time period greater than a specified time threshold; and restoring charging with the first real-time charging current, when it is monitored that the real-time temperature of the battery is less than or equal to a second temperature threshold.

7. The charging control method according to claim 6, wherein the second temperature threshold is less than the first temperature threshold, and the first temperature threshold is close to but less than a maximum temperature in a corresponding charging temperature range when the battery is charged with the first real-time charging current.

8. The charging control method according to claim 1, wherein the first real-time charging current is a maximum charging current supported by the battery.

9. A mobile terminal implementing the method according to claim 1, comprising:
the battery;
a processing circuit; and
a memory device storing instructions for execution by the processing circuit to implement operations of the method;
wherein the mobile terminal is configured to maintain the first real-time charging current that is a high-current high-power fast charging in a temperature range of 15° C. to 45° C., while alleviating temperature rise problem during the high-current high-power fast charging.

10. A non-transitory computer-readable storage medium having stored therein instructions that, when executed by a processor of a mobile terminal, causes the mobile terminal to perform the charging control method according to claim 1.

11. A charging control device, comprising:
a processor; and
a memory for storing instructions executable by the processor;
wherein the processor is configured to:
monitor a real-time temperature of a battery during charging the battery with a first real-time charging current;
reduce the first real-time charging current to a second real-time charging current at a specified current reduction rate, when the temperature monitoring component monitors that the real-time temperature of the battery is greater than a first temperature threshold by reducing the first real-time charging current to a second real-time charging current through at least one cycle, when the temperature monitoring component determines that the real-time temperature of the battery is greater than the first temperature threshold, wherein each cycle is matched with a corresponding current reduction rate, and charge the battery according to the second real-time charging current, wherein the second real-time charging current is a corresponding real-time charging current when the real-time temperature of the battery is less than the first temperature threshold.

12. The charging control device according to claim 11, wherein the processor is further configured to reduce the first real-time charging current to a second real-time charging current through at least one cycle by:

reducing the charging current at a current reduction rate corresponding to a current cycle, and re-monitoring the real-time temperature of the battery when a time length corresponding to the current cycle is reached;

responsive to that the real-time temperature of the battery is greater than the first temperature threshold, entering a next cycle; and responsive to that the real-time temperature of the battery is less than or equal to the first temperature threshold, using the current charging current as the second real-time charging current.

13. The charging control device according to claim 12, wherein the processor is further configured to:
reduce the first real-time charging current to a maximum charging current that corresponds to a charging current level corresponding to a current number threshold when the number of times of reducing the charging current reaches a specified number threshold;
wherein a different number threshold corresponds to a different charging current level, and a different charging current level corresponds to a different maximum charging current.

14. The charging control device according to claim 11, wherein a current reduction rate corresponding to an N-th cycle is greater than a current reduction rate corresponding to an (N−1)-th cycle, and N is a positive integer greater than or equal to 2.

15. The charging control device according to claim 11, wherein the processor is further configured to:
continuously monitor the real-time temperature of the battery, when it is determined that the real-time temperature of the battery is greater than the first temperature threshold; and
determine that a time length when the real-time temperature of the battery exceeds the first temperature threshold reaches a first time length before reducing the first real-time charging current to a second real-time charging current at a specified current reduction rate.

16. The charging control device according to claim 11, wherein the processor is further configured to perform at least one of:
restore charging with the first real-time charging current after charging the battery with the second real-time charging current for a time period greater than a specified time threshold; and
restore charging with the first real-time charging current when the temperature monitoring component monitors that the real-time temperature of the battery is less than or equal to a second temperature threshold.

17. The charging control device according to claim 16, wherein the second temperature threshold is less than the first temperature threshold, and the first temperature threshold is close to but less than a maximum temperature in a corresponding charging temperature range when the battery is charged with the first real-time charging current.

18. The charging control device according to claim 11, wherein the first real-time charging current is a maximum charging current supported by the battery.

* * * * *